United States Patent
Kalsi (10) Patent No.: US 6,768,232 B1
(45) Date of Patent: Jul. 27, 2004

(54) HIGH TEMPERATURE SUPERCONDUCTOR ROTOR FOR A SYNCHRONOUS MACHINE

(75) Inventor: Swarn S. Kalsi, Shrewsbury, MA (US)

(73) Assignee: American Semiconductor Corporation, DE (US)

(*) Notice: Subject to any disclaimer, the term of this patent is extended or adjusted under 35 U.S.C. 154(b) by 0 days.

(21) Appl. No.: 09/696,363

(22) Filed: Oct. 25, 2000

Related U.S. Application Data (63) Continuation-in-part of application No. 09/251,310, filed on Feb. 17, 1999, now Pat. No. 6,140,719.

(51) Int. Cl.[7] .......................... H02K 55/00; H02K 55/04
(52) U.S. Cl. .......................... 310/52; 310/64; 310/261; 310/271
(58) Field of Search .............................. 310/52, 61, 64, 310/261, 271, 55, 65, 264, 179, 195

(56) References Cited

U.S. PATENT DOCUMENTS

| | | | | |
|---|---|---|---|---|
| 3,956,648 A | * | 5/1976 | Kirtley et al. ............ 310/40 R |
| 4,016,444 A | * | 4/1977 | Gillet .......................... 310/261 |
| 4,039,870 A | * | 8/1977 | Sterrett ........................ 310/52 |
| 4,063,122 A | * | 12/1977 | Kullmann et al. ............ 310/64 |
| 4,152,609 A | * | 5/1979 | Cooper et al. ................ 310/52 |
| 4,174,483 A | | 11/1979 | Vinokurov et al. ........... 310/52 |
| 4,204,134 A | * | 5/1980 | Fritz et al. ..................... 310/52 |
| 4,208,598 A | * | 6/1980 | Popov et al. .................. 310/64 |
| 4,267,473 A | * | 5/1981 | Gamble ........................ 310/52 |
| 4,277,705 A | * | 7/1981 | Rios .............................. 310/64 |
| 4,365,175 A | | 12/1982 | Eckels .......................... 310/53 |
| 4,386,289 A | * | 5/1983 | Intichar et al. ................ 310/52 |
| 5,066,638 A | * | 11/1991 | Lloyd et al. .................. 310/52 |
| 5,777,420 A | * | 7/1998 | Gamble et al. ............. 310/261 |
| 6,140,719 A | * | 10/2000 | Kalsi ........................... 310/52 |

OTHER PUBLICATIONS

D. Aized, B.B. Gamble, A. Sidi–Yekhlef and J.P. Voccio, D.I. Driscoll, B.A. Shoykhet and B.X. Zhang, "Status of the 1.000 hp HTS Motor Development." 1998 Applied Superconductivity Conference, Palm Desert CA, Sep. 14–18, 1998.

B. Gamble and J. Goldman, "High Temperature Superconducting Motor and Generators for Submarines and Surface Ships." Naval Symposium on Electric Machines, Newport, RI, Jul. 28–31, 1997.

J.W. Lue, M.S. Lubell, D. Aized, J.M. Campbell and R.E. Schwall "Quenches in a high–temperature superconducting tape and pancake coil." Cryogenics 36 (1996), 379–389.

R. Schifert, B. Zhang, LB. Shoykhet, D. Driscoll, A. Meyer, J. Zevchek and E. Johnson, B. Gamble, C. Prum, J. Voccio, H. Picard, "High Temperature Superconducting Synchronous Motor Design and Test." Power Conference, Apr. 1996.

* cited by examiner

*Primary Examiner*—Burton Mullins
(74) *Attorney, Agent, or Firm*—Fish & Richardson P.C.

(57) ABSTRACT

A high temperature superconducting rotor for a synchronous machine includes a high temperature superconducting field winding, a field winding support concentrically arranged about the high temperature superconducting field winding, and a thermal reserve concentrically arranged about the field winding support. The thermal reserve is thermally coupled to the field winding to maintain a temperature differential between the thermal reserve and the field winding not greater than about 10 K.

26 Claims, 5 Drawing Sheets

HIGH TEMPERATURE SUPERCONDUCTOR ROTOR FOR A SYNCHRONOUS MACHINE

This is a CIP of application Ser. No. 09/251,310, filed Feb. 17, 1999, now U.S. Pat. No. 6,140,719.

BACKGROUND OF THE INVENTION

This invention relates to a high temperature superconducting rotor for a synchronous machine.

Typically, a superconducting winding of the rotor in a superconducting machine is cooled with a cryogenic refrigeration system. In the event of a refrigeration system failure, the superconducting winding will heat and eventually quench, leading to total machine failure.

SUMMARY OF THE INVENTION

A rotor having a thermal reserve arranged about a high temperature superconducting (HTS) winding is provided. In the event of a refrigeration system failure, the thermal reserve absorbs thermal energy from the HTS winding, thereby reducing the rate of increase of the temperature of the superconducting winding.

In accordance with one aspect of the invention, a high temperature superconducting rotor is provided including a high temperature superconducting field winding, a field winding support concentrically arranged about the high temperature superconducting field winding, and a thermal reserve concentrically arranged about the field winding support. The thermally reserve is coupled to the field winding to maintain a temperature differential between the thermal reserve and the field winding not greater than about 10 K.

Embodiments of this aspect of the invention may include one or more of the following features.

The thermal reserve includes a thermally conductive material. The material is electrically conductive, for example, aluminum or ATTA®. The material includes segmentation normal to the rotor axis, along the rotor axis, or both. The material, for example, aluminum, is shrunk fit over the field winding support.

Alternatively, the thermal reserve includes a material that is electrically nonconductive, for example, a ceramic, including beryllium oxide or alumina.

The rotor includes a banding concentrically arranged about the thermal reserve. The banding includes an electrically conductive material, for example, steel, an electrically nonconductive material, for example, Kevlar or glass fiber, or both. The banding includes segmentation normal to the rotor axis.

The rotor includes an outer layer concentrically arranged about the thermal reserve. The outer layer includes a thermally nonconductive material. The outer layer includes either electrically conductive materials, electrically nonconductive materials, or both. Electrically conductive materials in the outer layer are configured to prevent the flow of eddy currents; for example, a layer of aluminum coated mylar is used. The aluminum coating includes segments. A banding is concentrically arranged about the outer layer.

In accordance with another aspect of the invention, a superconducting machine has a rotor. The rotor includes a high temperature superconducting field winding and a field winding support for securing the field winding. The field winding support is electrically isolated from the field winding. An AC flux shield is concentrically arranged about the field winding. A thermal reserve is concentrically arranged about the AC flux shield and thermally coupled to the field winding to maintain a temperature differential between the thermal reserve and the field winding not greater than about 10 K. The machine further includes a stator concentrically arranged about the rotor.

In accordance with an embodiment of this aspect of the invention, a cryogenic refrigeration system is thermally coupled to the rotor.

In accordance with another aspect of the invention, a method is provided for limiting the rate of increase in the temperature of a superconducting winding. The method includes concentrically arranging a thermal reserve about and in thermal contact with the superconducting winding, and maintaining a temperature diferrential between the thermal reserve and the field winding no greater than about 10 K.

Embodiments of this aspect of the invention may include one or more of the following features.

The invention includes within the thermal reserve a thermally conducting material. Within the thermal reserve, an electrically nonconductive material is disposed between segments of an electrically conductive material. Within the thermal reserve, configuring the electrically nonconductive material to suppress eddy currents. The invention further includes concentrically arranging a thermally nonconductive material about the thermally conductive material.

According to another aspect of the invention, a high temperature superconducting rotor includes a high temperature superconducting field winding, a field winding support concentrically arranged about the high temperature superconductor field winding, and a thermal reserve concentrically arranged about the field winding support. The thermal reserve includes ATTA® which is thermally conductive and electrically nonconductive.

DESCRIPTION OF THE PREFERRED EMBODIMENT

Figure 1:
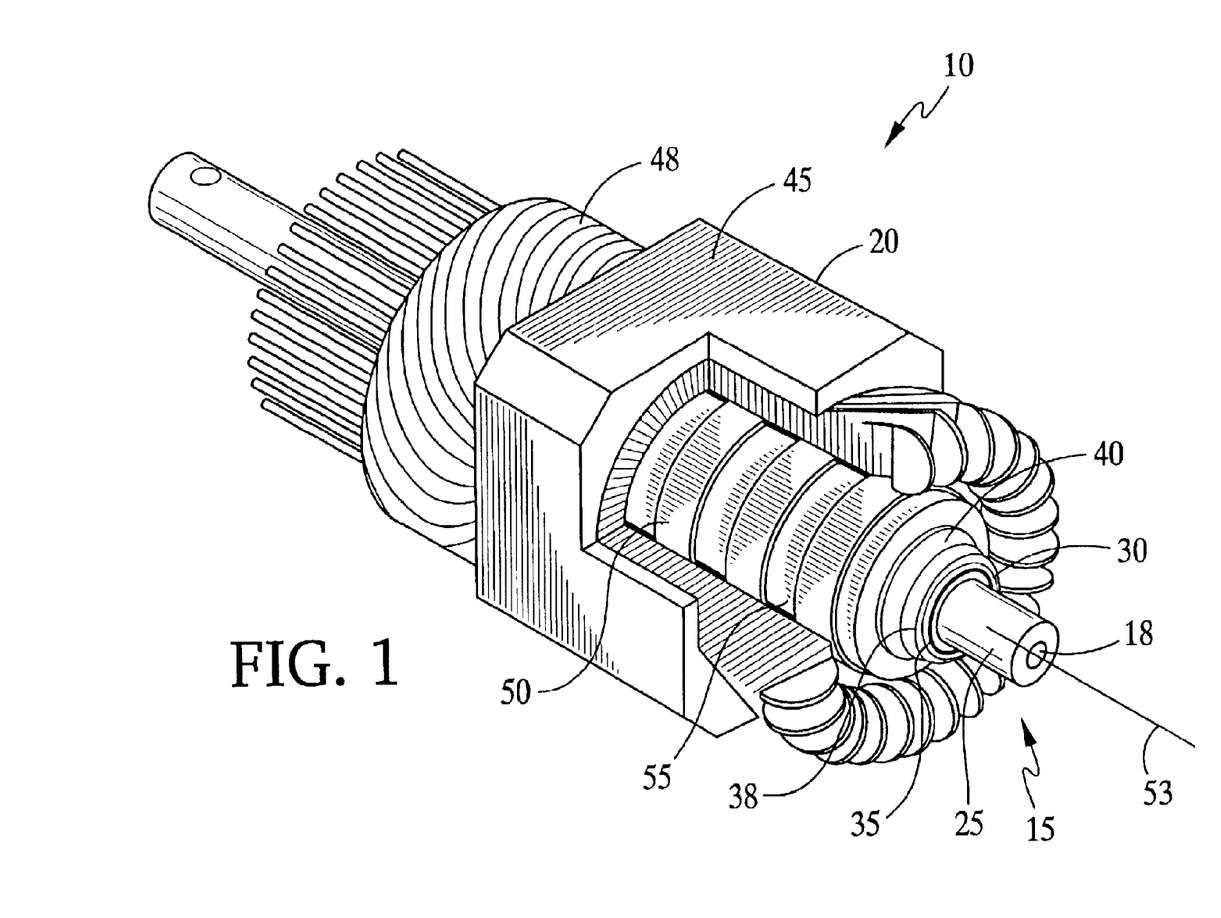
FIG. 1 is a diagrammatic illustration of the rotor and stator assemblies of a superconducting machine.

Referring to FIG. 1, a superconducting machine 10, for example, a motor or generator, includes a rotor assembly 15 and a stator assembly 20 concentrically arranged about rotor assembly 15. At the center 18 of rotor assembly 15 is a drive shaft 25. Rotor assembly 15 is attached to drive shaft 25 to rotate with drive shaft 25. Stator assembly 20 is stationary and includes a frame 45 and a stator winding 48.

Rotor assembly 15 includes a rotor winding support 30 concentrically arranged about drive shaft 25 and enclosing rotor winding 35. Rotor winding 35 is made of a high temperature superconducting material of the type that operates in the temperature range of 20–40 K. Rotor winding 35 is made, for example, using the react-and-wind method, as known in the art, or using a wind-and-react method, as described in Manlief et al., U.S. Pat. No. 5,798,678, entitled "Superconducting Wind-and-React-Coils and Methods of Manufacture," hereby incorporated by reference, or as described in Gamble et al., U.S. Pat. No. 5,777,420, entitled "Superconducting Synchronous Motor Construction," hereby incorporated by reference.

An AC flux shield 38 is concentrically arranged about winding support 30 preventing AC currents generated during motor transients from reaching rotor winding 35.

Figure 2:
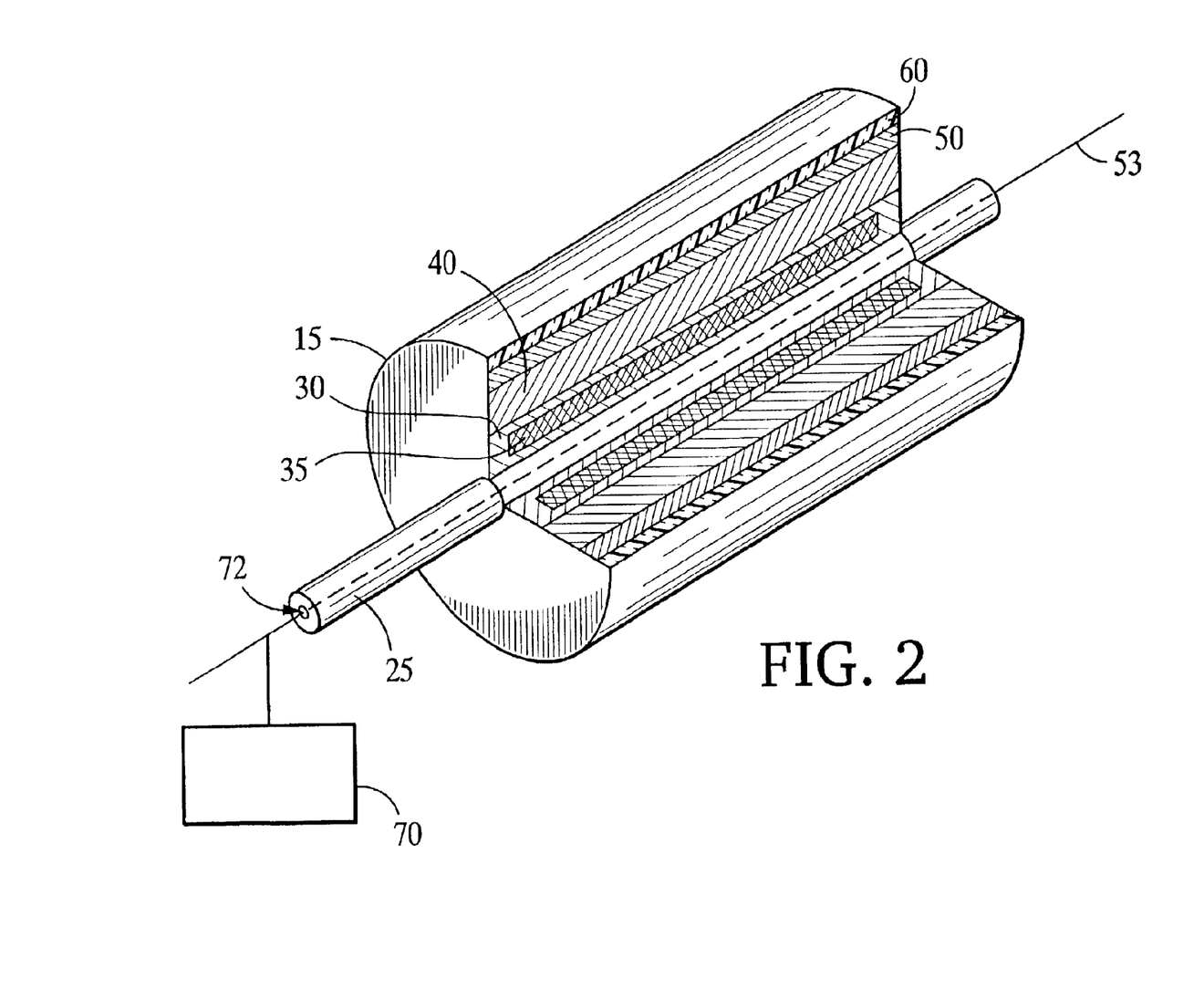
FIG. 2 is a cut-away view of the rotor assembly of FIG. 1.

Referring also to FIG. 2, rotor winding support 30 is made out of aluminum or other suitable structural material. Rotor winding support 30 acts as an AC flux shield if made from aluminum, copper, steel, or other electrically conductive material (for example, a material having an electrical resistivity of up to about 50 micro-ohms-cm), dispensing with the need to have a separate AC flux shield 38 as shown in FIG. 1.

Concentrically arranged about winding support 30 is a thermal reserve 40 thermally coupled to rotor winding 35 by rotor winding support 30. Concentrically arranged around thermal reserve 40 is a banding 50. Banding 50 secures thermal reserve 40 to rotor winding support 30.

Figure 3:
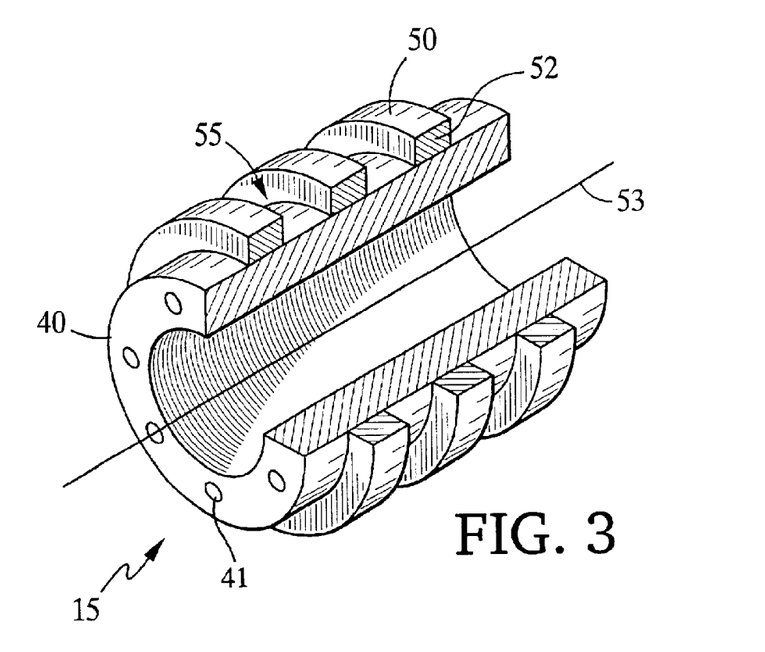
FIG. 3 is a perspective view of the rotor assembly of FIG. 2 with a banding surrounding a thermal reserve.

Referring to FIG. 3, banding 50 is formed from a metallic material, such as steel, which is segmented along a cross-sectional plane normal to axis 53 of rotor assembly 15; Segmentation of banding 50 is achieved by placing multiple individual bands (three are shown) around thermal reserve 40. This structure electrically isolates each individual band 52 preventing current flow in a direction along axis 53 of rotor assembly 15. The isolation is provided by a gap 55 between the individual bands. Referring again to FIG. 2, surrounding the banding is an outer layer 60 that shields rotor assembly 15 from heat generated by stator winding 48.

Connected to drive shaft 25 is a refrigeration system, for example, a cryocooler 70 operating with cold helium gas, for cooling rotor winding 35 during normal operation. Cold helium gas for cooling is fed through a port 72 in drive shaft 25. Ducts (not shown) in a drive shaft 25 circulate the cold helium gas around rotor winding 35 to draw heat from rotor assembly 15. Cooling is aided by the use of cooling channels in both winding support 30 and thermal reserve 40.

In the event of cryocooler failure, heat buildup in rotor winding 35 causes rotor winding 35 to lose its superconducting characteristics. The rate of heat buildup is reduced, however, by thermal reserve 40. Thermal reserve 40 is thermally conductive, having a thermal conductivity sufficiently high to limit the temperature differential between thermal reserve 40 and winding 35 to some predetermined value. The predetermined value is dependent upon the specific application. In the disclosed embodiment, the thermal reserve has a sufficient thermal conductivity to limit the temperature differential at the boundary between thermal reserve 40 and winding 35 to at most, for example, not greater than about 10 K. Preferably, the differential will be less than 5 K. Even more preferably, the differential will be about 1 K. Thermal reserve 40 absorbs heat generated by rotor winding. 35, decreasing the rate at which rotor winding 35 increases in temperature, prolonging the period in which rotor winding 35 remains within the superconducting temperature range.

Figure 4:
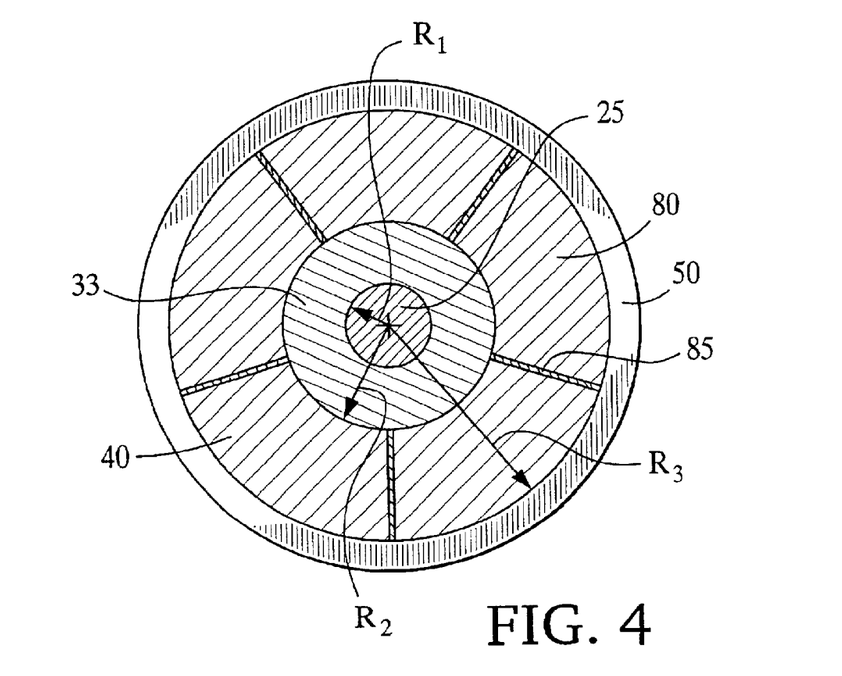
FIG. 4 is a cross-sectional view of the rotor assembly of FIG. 2 with a thermal reserve segmented along the axis of the rotor.

Referring to FIG. 4 (in which for ease of discussion, rotor winding 35 and rotor winding support 30 are illustrated as a single structure—rotor winding combination 33), thermal reserve 40 is shown divided into five segments 80 along axis 53 of rotor assembly 15. Each segment 80 is, for example, made of aluminum and is electrically isolated from the other segments by an electrically insulating material 85 made of, for example, metal oxides, epoxies, or Kapton®, a registered trademark of E. I. du Pont de Nemours and Company. The segmentation suppress eddy currents otherwise resulting from the fields produced by stator winding 48. These eddy currents would produce heat losses in thermal is reserve 40 decreasing the efficiency of the machine and reducing the time of operation during cryocooler failure.

Alternatively, the thermal reserve can be formed from ATTA®, availabe from Browne Technology, Inc., Brentwood, Tenn. ATTA® has a thermal conductivity (greater than about 400 W/m-K) better than copper while its elecctrical resistivity (500 micro-ohm-cm) is 200 times that of copper. ATTA® offers optimum properties of thermal and electrical conductivities for thermal reserve application. The material is avialable in 1–30 mil thick sheet or tape form and can be wrapped to fill the thermal reserve volume. There is no need for circumferential or axial segmentation of the thermal reserve.

The additional operation time provided by thermal reserve 40 in the event of cryocooler failure is calculated by comparing the temperature increase of rotor winding combination 33 without thermal reserve 40 with rotor winding combination 33 surrounded by thermal reserve 40.

The field winding combination 33 has an inner radius R1, for example, 0.5 meters (the radius of drive shaft 25), an outer radius R2, for example, 0.53175 meters, and a length, for example, 0.6096 m. The volume of the field winding combination is:

$$\pi*(0.53175 \text{ m}^2 - 0.5 \text{ m}^2)*0.6096 \text{ m} = 6.274*10^4 \text{ cm}^3$$

If field winding support 30 is made of aluminum, the specific heat of field winding combination 33 can be roughly approximated as equal to the specific heat of aluminum, which at 25 K is:

$$\eta = 3.5*10^5 \frac{\text{joule}}{\text{m}^3 * \text{K}}$$

The heat capacity of winding combination 33 is determined by multiplying the volume of winding combination 33 by the specific heat and by the acceptable change in temperature. The acceptable change in temperature is determined by subtracting the normal operating temperature of rotor winding 35 from the maximum operating temperature, which is the quench temperature of rotor winding 35 decreased for some margin of safety. Typically, this maximum operating temperature will be 5 K above the normal operating temperature. The heat capacity of winding combination 33 under these conditions is:

$$Q_{capacity} = 6.274*10^4 \text{ cm}^3 * 3.5*10^5 \frac{\text{joule}}{\text{m}^3 * \text{K}} * 5 \text{ K} = 1.098*10^5 \text{ joule}$$

The operating time following cryocooler failure is calculated by dividing the heat capacity of rotor winding combination 33 by the power loss in the field winding. Once this time is reached, the power loss will have heated the winding combination 33 to the maximum acceptable operating temperature. Typically, a superconducting machine will have a power loss in the superconducting winding of 25 watts, resulting in an operating time after cryocooler failure of 1.22 hours.

$$\text{Time} = \frac{1.098 * 10^5 \text{ joules}}{25 \text{ watts}} = 1.22 \text{ hours}$$

The operating time after cryocooler failure will now be calculated with the addition of thermal reserve 40. Thermal reserve 40 is, for example, constructed from aluminum and has a thickness, t, of 0.0381 m. The volume of thermal reserve 40 is:

$$\pi*(0.5699^2 \text{ m} - 0.53175^2 \text{ m})*0.6096 \text{ m} = 8.038*10^4 \text{ cm}^3$$

The heat capacity of thermal reserve 40 is the volume multiplied by the specific heat of the material used, in this example, aluminum:

$$Q_{capacity} = 8.038*10^4 \text{ cm}^3 * 3.5*10^5 \frac{\text{joule}}{\text{m}^3 * \text{K.}} * 5 \text{ K.} = 1.407*10^5 \text{ joule}$$

Assuming the same 25 watt loss in field winding 35 as in the prior example, but this time adding together the heat capacities of rotor winding combination 33 and thermal reserve 40 with the preferred thermal conductivity, the operation time available following a cryogenic refrigeration failure is:

$$\text{Time} = \frac{1.407*10^5 \text{ joules} + 1.098*10^5 \text{ joules}}{25 \text{ watts}} = 2.783 \text{ hours}$$

Accordingly, the use of thermal reserve 40 with the indicated dimensions keeps the high temperature superconducting machine in operation for more than one and a half additional hours. During this additional time, a repair crew notified of the refrigeration system failure can much more likely repair or replace the refrigeration system, keeping the machine in operation.

Figure 5A:
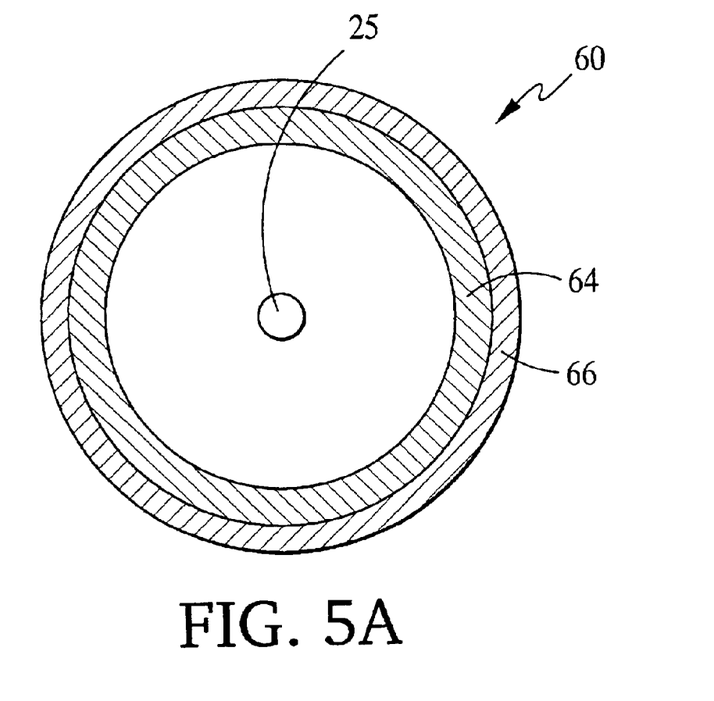
FIG. 5A is a depiction of an outer layer that is applied to the rotor assembly.

Outer layer 60, shown in FIG. 2, will now be described in greater detail. Referring to FIG. 5A, outer layer 60 is composed of a multi-layer insulation, made of an interior layer 64 attached to a thin strong exterior layer material 66. Interior layer 64 is made of, for example, many layers of aluminized mylar. Surrounding interior layer 64 is an exterior layer 66, preferably 1/16 inch thick, of Kevlar or other strong material, such as steel, a composite of G10 materials, or fiber reenforced epoxies.

Figure 5B:
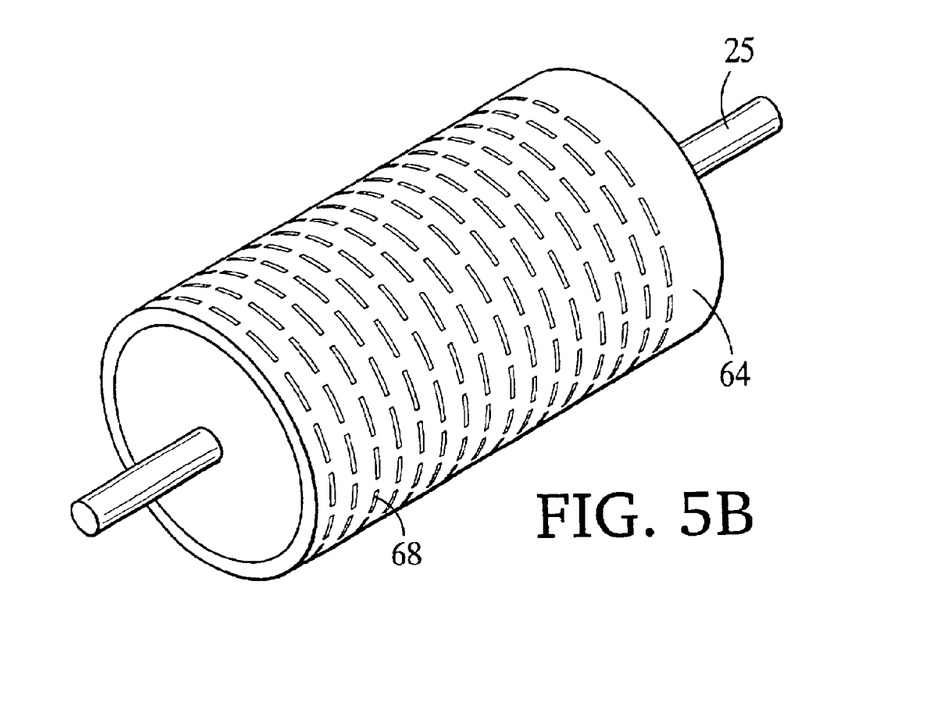
FIG. 5B is a depiction of the aluminum portion of the outer layer shown in FIG. 5A.

Referring to FIG. 5B, the aluminum of interior layer 64 is segmented with slots 68. Slots 68 are arranged so eddy currents are suppressed.

Referring again to FIG. 1, stator winding 48 is made of conventional nonsuperconducting wire and is water cooled by the inclusion of cooling tubes (not shown) both interwound with stator winding 48 and enclosed within frame 45. There is sufficient increase in efficiency, power transfer, and size reduction with the rotor winding alone being made of a superconducting material. Frame 45 is made of any suitable strong material, such as steel.

Alternative embodiments are within the scope of the following claims. For example, thermal reserve 40 can be divided into 8, 10, or even more segments. In yet another alternative embodiment, shown in FIG. 6, thermal reserve 40 is segmented normal to axis 53 to prevent the flow of currents in the direction along the axis of the rotor, but segment-free along axis 53. Thick disks of material 100 are aligned along axis 53 and each disk 100 is concentrically arranged about winding combination 33. Each disk 100 is electrically isolated from the others by an insulating material 105. For example, each disk 100 is made of aluminum and may be shrunk fit over the winding combination 33.

Figure 6:
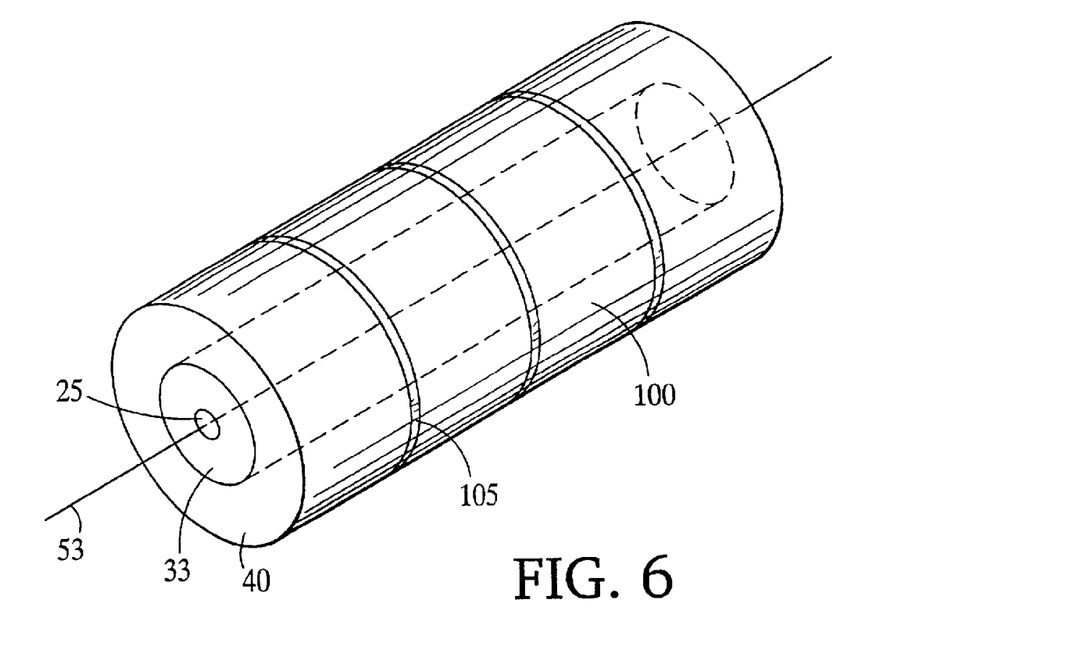
FIG. 6 is a perspective view of the rotor assembly of FIG. 2 with the thermal reserve segmented normal to the axis of the rotor.

In certain circumstances, the ease of construction of the rotor of FIG. 6 outweighs the losses generated by not segmenting the aluminum in a direction along the axis of the rotor. It may also be desirable in certain applications to segment thermal reserve 40 in the directions both normal to and along axis 53 of the rotor in order to suppress both axial and normal currents.

In yet another embodiment, thermal reserve 40 is made of an electrically nonconductive material, for example, beryllium oxide or alumina. The use of an electrically nonconductive material prevents eddy currents from being generated in thermal reserve 40.

In other embodiments, banding 50 is modified by inserting a nonconductive material between the individual conductive bands. By providing a nonconductive material of sufficient strength, such as Kevlar, glass filaments or fibers, or any other high-strength electrically nonconductive material, the nonconductive material also acts as a banding. Alternatively, banding 50 is made entirely of nonconductive materials.

In yet other embodiments, exterior layer 66 of outer layer 60 is of sufficient strength to also serve as banding 50. In this case, exterior layer 66 is provided with a greater thickness than would otherwise be necessary to secure outer layer 60 alone to rotor assembly 15. Exterior layer 66 can also be segmented normal to axis 53 of rotor assembly 15.

In other embodiments, rotor winding support 30 is made of an electrically nonconductive material.

What is claimed is:

1. A high temperature superconducting rotor, comprising:
 a high temperature superconducting field winding,
 a field winding support concentrically arranged on the high temperature superconductor field winding, and
 a thermal reserve concentrically arranged on the field winding support, the thermal reserve configured to absorb heat from the field winding to maintain a temperature differential between the thermal reserve and the field winding not greater than about 10 K.

2. The rotor of claim 1 wherein the thermal reserve comprises a material that is thermally conductive.

3. The rotor of claim 1 wherein the thermal reserve comprises a ceramic material.

4. The rotor of claim 1 wherein the thermal reserve comprises Alumina.

5. The rotor of claim 1 wherein the thermal reserve comprises ATTA®.

6. The rotor of claim 1 wherein the thermal reserve comprises Beryllium Oxide.

7. The rotor of claim 1 further comprising a banding concentrically arranged about the thermal reserve.

8. The rotor of claim 7 wherein the banding comprises an electrically conductive material.

9. The rotor of claim 8 wherein the electrically conductive material includes segmentation in a direction normal to the axis of the rotor.

10. The rotor of claim 7 wherein the banding comprises an electrically nonconductive material.

11. The rotor of claim 10 wherein the banding comprises Kevlar.

12. The rotor of claim 10 wherein the banding comprises glass fiber.

13. The rotor of claim 1 further comprising an outer layer concentrically arranged about the thermal reserve, the outer layer comprising a thermally non-conductive material.

14. The rotor of claim 13 wherein the outer layer comprises an electrically nonconductive material.

15. The rotor of claim 13 wherein the outer layer comprises an electrically conductive material.

16. The rotor of claim 15 wherein the electrically conductive material is configured to prevent the flow of eddy currents within the electrically conductive material.

17. The rotor of claim 16 wherein the outer layer comprises multiple layers of aluminum coated mylar.

18. The rotor of claim 17 wherein the aluminum coating includes segments whereby electric current does not flow in a direction along the axis of the rotor.

19. The rotor of claim 13 further comprising a banding concentrically arranged about the outer layer.

20. The high temperature superconducting rotor of claim 1, wherein the thermal reserve contacts the winding support.

21. A method of limiting the rate of increase in the temperature of a superconducting winding, comprising:

concentrically arranging a thermal reserve on and in thermal contact with the superconducting winding, the thermal reserve absorbing heat from the superconducting winding; and maintaining a temperature differential between the thermal reserve and the field winding no greater than about 10 K.

22. The method of claim 21 wherein the thermal reserve comprises a thermally conducting material.

23. The method of claim 22 further comprising:

concentrically arranging a thermally nonconductive material about the thermally conductive material.

24. The method of claim 21 further comprising:

configuring the thermal reserve to suppress electric eddy currents from flowing about the superconducting winding.

25. The method of claim 21 further comprising supporting the superconducting windings with a winding support, the thermal reserve contacting the winding support.

26. A high temperature superconducting rotor, comprising: a high temperature superconducting field winding, a field winding support concentrically arranged about the high temperature superconductor field winding, and a thermal reserve concentrically arranged about the field winding support, the thermal reserve including ATTA® which is thermally conductive and electrically nonconductive.

* * * * *

UNITED STATES PATENT AND TRADEMARK OFFICE
CERTIFICATE OF CORRECTION

PATENT NO. : 6,768,232 B1
DATED : July 27, 2004
INVENTOR(S) : Swarn S. Kalsi It is certified that error appears in the above-identified patent and that said Letters Patent is hereby corrected as shown below:

Title page,
Item [73], Assignee, please correct to read:
-- American Superconductor Corporation, Westborough, MA (US) --.

Signed and Sealed this

Fourth Day of October, 2005

JON W. DUDAS
*Director of the United States Patent and Trademark Office*